(12) United States Patent
Pischke et al.

(10) Patent No.: US 9,150,170 B2
(45) Date of Patent: Oct. 6, 2015

(54) CIRCUIT SYSTEM FOR REDISTRIBUTION OF ELECTRICAL ENERGY IN A VEHICLE

(75) Inventors: Ulf Pischke, Stuttgart (DE); Nils Draese, Feuerbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 799 days.

(21) Appl. No.: 13/383,765

(22) PCT Filed: Jul. 9, 2010

(86) PCT No.: PCT/EP2010/059913
§ 371 (c)(1),
(2), (4) Date: Jul. 31, 2012

(87) PCT Pub. No.: WO2011/012428
PCT Pub. Date: Feb. 3, 2011

(65) Prior Publication Data
US 2012/0286569 A1    Nov. 15, 2012

(30) Foreign Application Priority Data
Jul. 31, 2009  (DE) .......................... 10 2009 028 147

(51) Int. Cl.
*B60L 1/00* (2006.01)
*B60R 16/03* (2006.01)
*H02J 1/08* (2006.01)
*H02J 7/14* (2006.01)
*H02J 1/00* (2006.01)

(52) U.S. Cl.
CPC . *B60R 16/03* (2013.01); *H02J 1/08* (2013.01); *H02J 7/1423* (2013.01); *H02J 2001/008* (2013.01)

(58) Field of Classification Search
None
See application file for complete search history.

(56) References Cited

U.S. PATENT DOCUMENTS

| | | | |
|---|---|---|---|
| 6,989,653 B2 * | 1/2006 | Iwata et al. | 320/134 |
| 7,180,205 B2 * | 2/2007 | Wirdel | 307/10.1 |
| 2004/0130214 A1 | 7/2004 | Murty et al. | |
| 2004/0222771 A1 | 11/2004 | Iwata et al. | |
| 2008/0220932 A1 | 9/2008 | Bosch et al. | |
| 2010/0231178 A1 * | 9/2010 | Handa et al. | 320/163 |

FOREIGN PATENT DOCUMENTS

| | | |
|---|---|---|
| CN | 1040711 | 3/1990 |
| CN | 101267965 | 9/2008 |
| DE | 3717716 | 10/1987 |

(Continued)

OTHER PUBLICATIONS

International Search Report, PCT International Application No. PCT/EP2010/059913, dated May 11, 2011.

(Continued)

*Primary Examiner* — Rexford Barnie
*Assistant Examiner* — David Shiao
(74) *Attorney, Agent, or Firm* — Kenyon & Kenyon LLP (57) ABSTRACT

A circuit system for a vehicle electrical system, including a base vehicle electrical system having an energy store, a vehicle power supply system having an additional energy store, and a DC/DC converter. The energy store and the additional energy store are connected in series, and the DC/DC converter is provided for coupling between the base vehicle electrical system and the vehicle power supply system. A method for operating a vehicle electrical system is also described.

18 Claims, 4 Drawing Sheets

(56) References Cited

FOREIGN PATENT DOCUMENTS

| | | |
|---|---|---|
| DE | 10231379 | 1/2004 |
| DE | 10258894 | 1/2004 |
| DE | 102 55 433 | 6/2004 |
| DE | 102004043129 | 3/2006 |
| EP | 1130737 | 9/2001 |
| EP | 1749701 | 2/2007 |
| JP | 2000-60019 | 2/2000 |
| JP | 2005-530081 | 10/2005 |
| WO | WO 03099605 | 12/2003 |
| WO | WO 2004/006422 | 1/2004 |
| WO | WO 2006/123682 | 11/2006 |
| WO | WO 2008007540 A1 * | 1/2008 |
| WO | WO 2009/090229 | 7/2009 |

OTHER PUBLICATIONS

Response to International Search Report (with translation), PCT International Application No. PCT/EP2010/059913, dated Nov. 29, 2011.

\* cited by examiner

CIRCUIT SYSTEM FOR REDISTRIBUTION OF ELECTRICAL ENERGY IN A VEHICLE

FIELD OF THE INVENTION

The present invention relates to a circuit system for a vehicle electrical system, and a method for operating a vehicle electrical system.

BACKGROUND INFORMATION

For vehicle electrical system topologies, conventional variants having multivoltage generators, i.e., variable-voltage generators, and downstream double-layer capacitors (DLC) or ultracapacitors (UCAP) are designed for a variable voltage level greater than 14 V, generally 30 V to 40V.

It is thus possible to increase the peak performance of the vehicle electrical system, typically for optimizing the recovery of electrical energy, i.e., the recuperation capacity. This is achieved by increasing the maximum generator power at fairly high voltage, and providing one of the mentioned capacitors as a recuperation store with increased capability for peak charge acceptance. Because an ultracapacitor has a very large number of serial cells in order to achieve the high voltage, and a DC/DC converter is designed for coupling the main vehicle electrical system to the vehicle-power supply system with variable voltage for providing a power P which is generally greater than 1.5 kW, the mentioned modules result in high costs.

In addition, there is the option of coupling high-power consumers to a vehicle power supply system of a vehicle electrical system of this type. However, this has limitations due to the greatly fluctuating voltage, which is low prior to the recuperation and is subsequently high. Likewise, conventional topology variants supply a higher voltage to high-power consumers by serial connection of an energy store (a capacitor or a second battery, for example) in series with the vehicle electrical system battery which is already present. The base vehicle electrical system of the vehicle electrical system, having a standard generator and further modules, is only slightly influenced by these changes in the vehicle power supply system.

In these topologies, an electrically insulating DC/DC converter is generally used for supplying the additional energy store. This results in the option of supplying high-power consumers with an increased voltage and with minimal effects on the rest of the vehicle electrical system caused by the voltage dip at high current load, for example. However, the additional expenditure for achieving this single function is relatively high.

A device for supplying power, in particular for a vehicle electrical system, is described in German Patent Application No. DE 10 2004 043 129 A1. An electric machine which is operable as a starter generator with the aid of a pulse width modulation inverter and a changeover switch is connected to the battery and the vehicle electrical system. This connection is broken via the changeover switch, so that a capacitor is connected to the pulse width modulation inverter. The starter generator may be operated in generator mode as well as in engine mode. In addition, recovery of electrical energy into the battery or the capacitor is possible when a deceleration is carried out in generator mode with the aid of the starter generator.

SUMMARY

The present invention relates to a circuit system for a vehicle electrical system, including a base vehicle electrical system having an energy store, which may also be referred to as a first energy store, a vehicle power supply system having an additional energy store, which may also be referred to as a second energy store, and a DC/DC converter, the two energy stores, i.e., the first energy store and the second energy store, being connected in series. The DC/DC converter is designed for coupling between the base vehicle electrical system and the vehicle power supply system.

Thus, the vehicle electrical system usually includes a vehicle electrical subsystem designed as a base vehicle electrical system, and a vehicle electrical subsystem designed as a vehicle power supply system. The DC/DC converter may be connected in parallel with at least one of the energy stores, and may be situated between the two vehicle electrical subsystems. As a further component, the generator may be connected in parallel with at least one of the energy stores. During operation of the circuit system, at least one of the energy stores may be supplied with electrical energy from the generator. In addition, the first energy store is designed as a battery or an accumulator, for example. The additional, i.e., second, energy store is designed, for example, as a capacitor (double-layer capacitor or ultracapacitor, for example) or as an accumulator (for example, a lead-acid store, a Li-ion store, or a store using an alternative storage technology). An energy store is associated with each vehicle electrical subsystem. It may be provided that the vehicle electrical system is also designed as part of the circuit system. In one application, the circuit system and the vehicle electrical system are provided for a motor vehicle.

In one variant of the circuit system, the two energy stores, i.e., the first energy store and the additional, i.e., second, energy store, are connected to the generator via at least one circuit. In a first case, the first energy store, usually the battery, and the base vehicle electrical system are connected to the generator via a first switch, and the additional energy store and the vehicle power supply system are connected to the generator via a second switch. In a second case, an optional toggle switch or changeover switch is provided via which either the first energy store (battery) and the base vehicle electrical system, or the additional energy store (capacitor) and the vehicle power supply system, are to be connected to the generator in alternation. In a third case, the switch between the generator and the first energy store, i.e., the base vehicle electrical system, is dispensed with; i.e., the generator is fixedly connected to the additional, i.e., second, energy store, and consequently to the vehicle power supply system.

The DC chopper controller, or DC/DC converter, may typically be designed as a potential-free and/or bidirectional DC/DC converter. Energy is to be transferred between the vehicle electrical subsystems with the aid of the DC/DC converter.

The circuit system may have a module for influencing a direction of a current flowing within the base vehicle electrical system. Thus, in certain operating states (a restart, for example) a current flow into certain vehicle electrical system branches (the starter, for example) may be prevented at the expense of other vehicle electrical system components. This module may be integrated into the DC/DC converter or designed as a separate component, for example as a circuit having a rectifying function, or a diode function or a diode characteristic.

In addition, an example method for operating a vehicle electrical system is provided, the vehicle electrical system including a base vehicle electrical system having an energy store, and a vehicle power supply system having an additional, i.e., second, energy store, as well as a DC/DC converter. The two mentioned energy stores are connected in series. A coupling between the base vehicle electrical system and the vehicle power supply system is established via the DC/DC converter.

At least four operating cases may be implemented with the aid of the example method. In a first, steady-state operating case, the DC/DC converter transfers energy from the vehicle power supply system into the base vehicle electrical system. In a second operating case, the capacitor is charged. In a third operating case, a charging current of the battery, i.e., the first energy store, is decreased, and a charging current of the capacitor, i.e., the second energy store, is increased, with a reversal of a flow direction of the energy through the DC/DC converter. In a fourth operating case, the base vehicle electrical system is assisted with energy from the second energy store, and is assisted by the DC/DC converter for relieving the first energy store. The four mentioned operating cases or operating modes may be carried out in alternation for the vehicle electrical system.

With the aid of the example embodiment of the present invention, a topology for a vehicle electrical system which is optimized with regard to cost and efficiency is provided as a result of the provided circuitry of the electronic components of the circuit system, which includes a series connection of energy stores. Among other things, the requirement for increased recuperation power for recovering electrical energy, for providing an increased voltage for high-power consumers with the least possible variation in voltage, and an increase in the efficiency in nonrecuperation mode may be met with the aid of the circuit system. It is thus possible to implement a topology for a vehicle electrical system which is optimized with regard to a cost-to-performance ratio and which is able to meet requirements for future vehicle electrical systems.

The base vehicle electrical system battery, as an energy store, i.e., first energy store, which generally has lead-acid, and the additional energy store, which is typically designed as an ultracapacitor or a Li-ion battery or lead-acid battery, may be provided as a structural unit or as two separate components in different installation spaces in the vehicle. Consumers of the vehicle electrical power system and of the vehicle electrical system are supplied from the various voltage levels which are regularly provided by the two energy stores of the circuit system.

In the further development of topology proposals as a result of the specialized circuitry of the DC/DC converter, only a low power of the DC/DC converter is necessary, even for high vehicle electrical system loads. Furthermore, an additional benefit for start-stop operation may be provided. With the aid of the circuitry of the DC/DC converter provided within the scope of the present invention, it is possible to minimize the size of the DC/DC converter. In addition, reduction in fuel consumption is also possible as a result of the provided energy supply of the vehicle electrical subsystems.

The embodiment of the present invention represents a circuit topology and operating strategy via which multiple savings approaches may be met while optimizing the level of expenditure. This results, among other things, in an increased generator voltage for increasing the generator efficiency. In coasting mode, when at least one of the electrical energy stores is charged, a recuperation potential may be increased in order to use the stored energy at a later time for assisting the vehicle electrical system. Assistance of the vehicle electrical system in start-stop operation is likewise possible. Thus, when the engine is restarted after a red traffic light, the voltage dip generated by the starter is compensated for on the vehicle electrical system side by the DC/DC converter. With the aid of the present invention it is likewise possible to meet possible requirements regarding protection against polarity reversal of the base vehicle electrical system battery. Furthermore, high-current consumers may be supplied at a higher voltage potential. A topology approach for an efficiency-optimized motor vehicle electrical system may be implemented with the aid of the present invention.

The described circuit system is designed to carry out all steps of the presented method. Individual steps of this method may also be carried out by individual components of the circuit system. In addition, functions of the circuit system or functions of individual components of the circuit system may be implemented as steps of the method. Furthermore, it is possible to implement steps of the method as functions of individual components of the circuit system or of the overall circuit system.

Further advantages and embodiments of the present invention result from the description and the figures.

It is understood that the features mentioned above and explained below are usable not only in the particular stated combination, but also in other combinations, or alone, without departing from the scope of the present invention.

DETAILED DESCRIPTION OF EXAMPLE EMBODIMENTS

The present invention is schematically illustrated in the figures based on specific embodiments, and is described in greater detail below with reference to the figures.

The figures are described in an interrelated and all-encompassing manner, with identical components being denoted by the same reference numerals.

Figure 1:
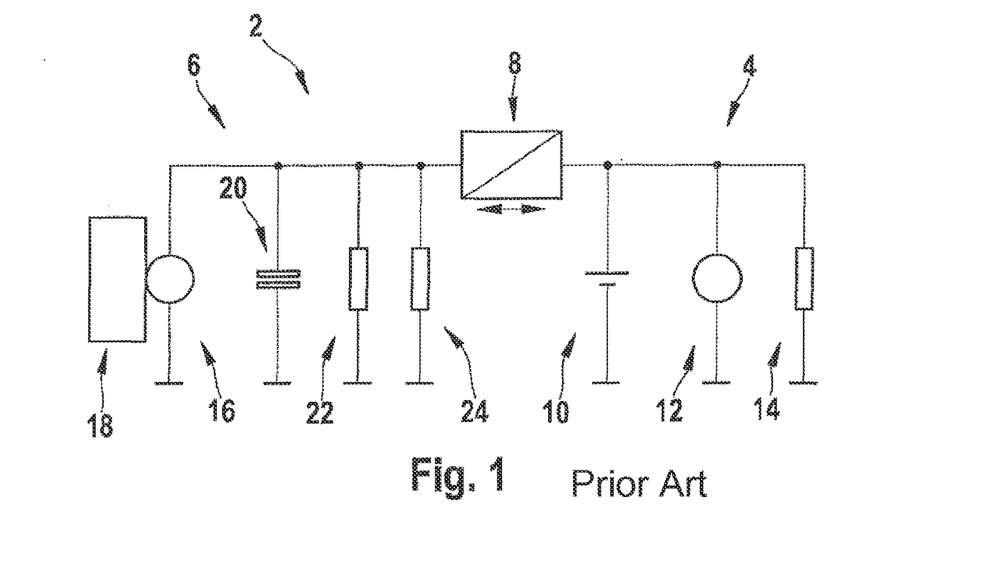
FIG. 1 shows a schematic illustration of a first conventional vehicle electrical system for a motor vehicle.

Conventional vehicle electrical system 2, schematically illustrated in FIG. 1, includes a main vehicle electrical system 4 which is designed for an operating voltage of 14 V, and a vehicle power supply system 6, which in the present case is designed for an operating voltage of 14 V to 42 V. Main vehicle electrical system 4 and vehicle power supply system 6 are connected to one another via a DC/DC converter 8.

In the present vehicle electrical system 2, it is provided that main vehicle electrical system 4 has a battery 10, a starter 12, and further consumers 14. Vehicle power supply system 6 includes a generator 16 which is associated with a regulating device 18, an ultracapacitor 20, and a first high-power consumer 22 provided for steering and a second high-power consumer 24 designed for heating.

Figure 2:
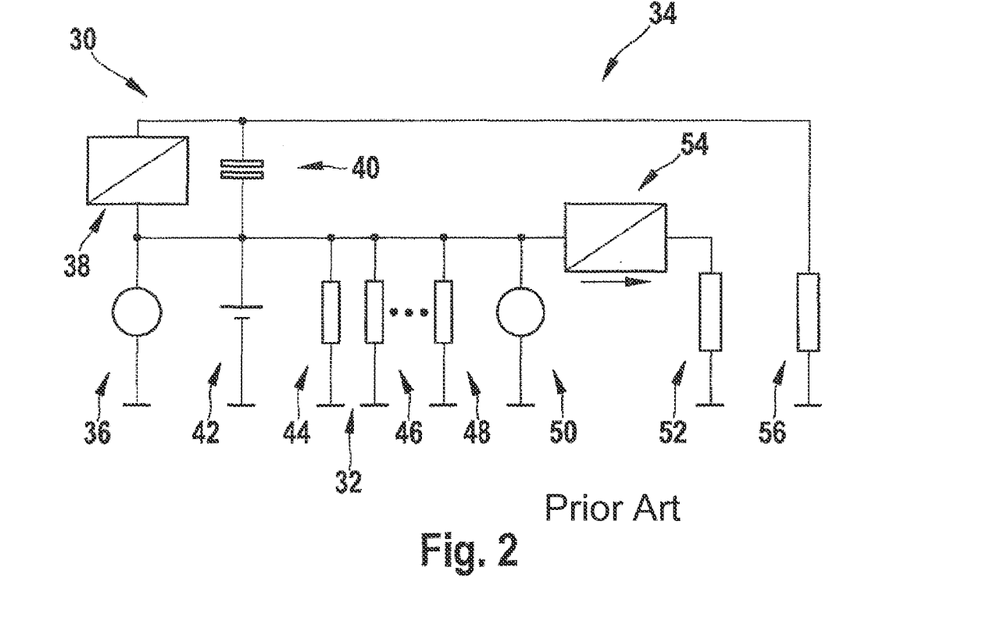
FIG. 2 shows a schematic illustration of a second conventional vehicle electrical system for a motor vehicle.

FIG. 2 shows a schematic illustration of a second conventional vehicle electrical system 30, which likewise has a main vehicle electrical system 32 which is designed for an operating voltage of 14 V, and a vehicle power supply system 34 which is designed for an operating voltage of greater than 14V. This vehicle electrical system 30 also includes a generator 36 and an electrically insulating DC/DC converter 38 which are connected in series, and an ultracapacitor 40. As components, main vehicle electrical system 32 has a battery 42, multiple consumers 44, 46, 48, a starter 50, and a further special consumer 52 which is connected to the other components of main vehicle electrical system 32 via an additional DC/DC converter 54. Vehicle power supply system 34 includes ultracapacitor 40 and a high-power consumer 56, which in the present case is designed as a module of an electronic power steering system.

Figure 3A:
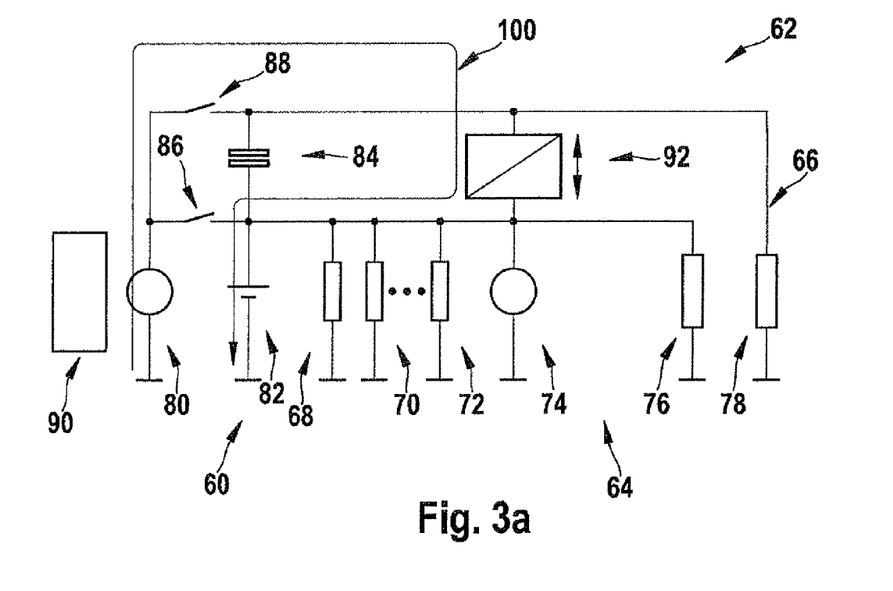
FIG. 3 shows a schematic illustration of a first specific example embodiment of a circuit system according to the present invention for a vehicle electrical system, in three different operating cases.
Figure 3B:
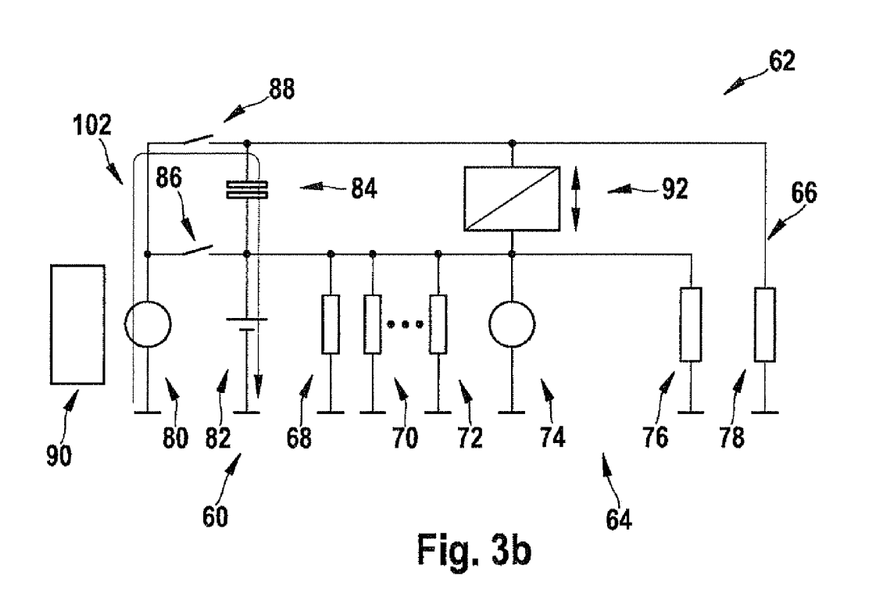
Figure 3C:
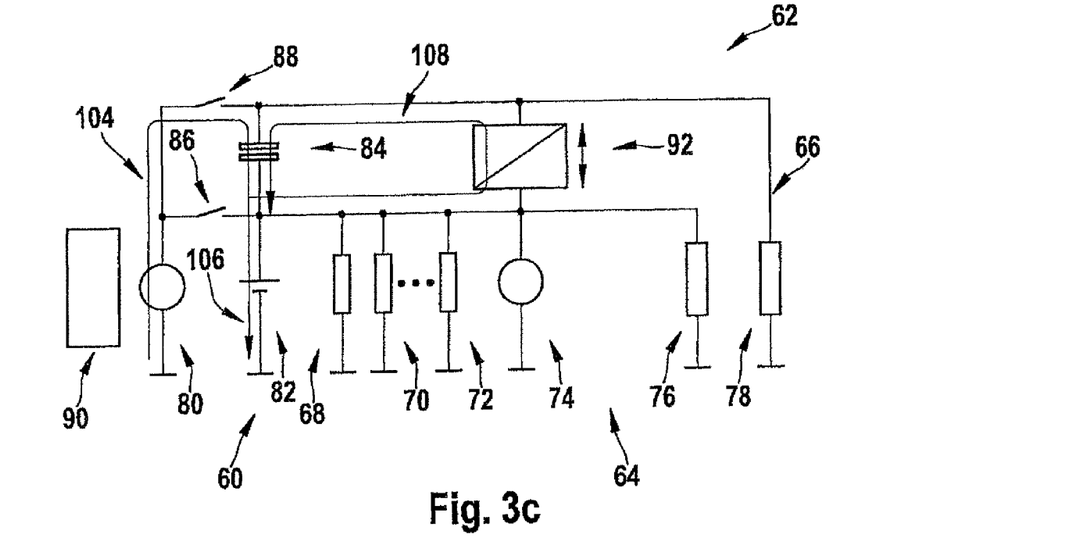

FIG. 3 shows a schematic illustration of a first specific embodiment of a circuit system 60 according to the present invention. FIG. 3a shows this circuit system 60 in a first operating case, FIG. 3b shows circuit system 60 in a second operating case, and FIG. 3c shows circuit system 60 in a third operating case.

Circuit system 60 illustrated in FIG. 3 has a first specific embodiment of a vehicle electrical system 62, which once again is subdivided into a base vehicle electrical system 64 and a vehicle power supply system 66. Base vehicle electrical system 64 includes multiple consumers 68, 70, 72, of which only three such consumers 68, 70, 72 are illustrated, a starter 74, and a special consumer 76. In the present case, vehicle power supply system 66 includes a high-power consumer 78. However, vehicle power supply system 66 could also be designed with multiple consumers, or without a consumer.

A generator 80, a first energy store, which in the present case is designed as a battery 82, and a second, i.e., additional, energy store, which in the present case is designed as a capacitor 84, typically an ultracapacitor (UCAP), are provided as additional components of the specific embodiment of circuit system 60 presented here. In the present case, a circuit has a first switch 86 and a second switch 88. A monitoring device 90 is designed for monitoring, and thus for controlling and/or for regulating, circuit system 60. Battery 82 and capacitor 84, and thus both energy stores, are connected in series. A DC/DC converter 92 is connected as an additional component between base vehicle electrical system 64 and vehicle power supply system 66.

In the described specific embodiment of circuit system 60, battery 82 is associated with base vehicle electrical system 64, and ultracapacitor 84 is associated with vehicle power supply system 66. Capacitor 84 is connected in parallel with DC/DC converter 92. Electrically insulating DC/DC converter 92 is designed for charge balancing of the two energy stores.

Furthermore, in circuit system 60, base vehicle electrical system 64 is designed for an operating voltage of 14 V, and vehicle power supply system 66 is designed for operation at a voltage of greater than 14 V. Generator 80 has an increased nominal voltage, and therefore may also be referred to as a so-called multivoltage generator 80. Battery 82 and capacitor 84 are supplied at increased efficiency with the aid of this generator 80. Within the scope of one specific embodiment of the method according to the present invention, an operating management system is provided for operating vehicle electrical system 62 and for implementation by monitoring device 90. For example, the voltage level of generator 80 is switched to a suitable voltage value, and therefore from an operating point of generator 80, as a function of a position of the two switches 86, 88, at least one of the two energy stores being supplied with energy.

During normal operation, second switch 88 is closed and first switch 86 is open. Generator 80 feeds an increased voltage into vehicle power supply system 66, and capacitor 84, which is usually designed as an UCAP, and battery 82, which are connected in series, are similarly charged. The efficiency of the energy generation is increased due to the increased voltage. Accordingly, a smaller generator design having lower weight and lower costs may be used on account of the increased power output.

In the first operating case illustrated in FIG. 3a, a flow of the energy is indicated by line 100. In this first operating case, which is also referred to as a steady-state operating case, the energy flows, starting from generator 80 with first switch 86 open, via closed second switch 88 and DC/DC converter 92, to battery 82. Capacitor 84 (UCAP) is charged in the first operating case. DC/DC converter 92 transfers energy from vehicle power supply system 66 into base vehicle electrical system 64, thus avoiding overcharging of capacitor 84. In the first operating case the entire power is taken over by DC/DC converter 92, which relays the power past capacitor 84.

Capacitor 84 is charged in the second operating case, illustrated as an example in FIG. 3b. For this purpose DC/DC converter 92 is switched off. A flow of the energy is indicated by line 102 in FIG. 3b. As a result, energy 102 flows, starting from generator 80, via second switch 88 to capacitor 84 and subsequently to battery 82.

During implementation of the third operating case shown in FIG. 3c, a so-called peak power operation is implemented. For recuperation, for example, it is provided that a large amount of energy is temporarily stored in the two energy stores. In this operating case, in FIG. 3c a flow of the energy is represented by line 104, which is branched into two sublines 106, 108. In this third operating case the energy flows, starting from generator 80, via second closed switch 88 to capacitor 84. As indicated by first subline 106, only a first portion of the energy flows to battery 82 after passing through capacitor 84, in order to prevent the battery from being overcharged. As indicated by subline 108, a second portion of the energy flows, starting from capacitor 84, via DC/DC converter 92 back to capacitor 84. As a result, capacitor 84 is supplied with a greater quantity of energy and is thus charged.

To avoid overcharging of capacitor 84, a DC/DC converter 92 is inserted between the vehicle electrical subsystems. In steady-state operation, as soon as capacitor 84 has reached its nominal voltage, DC/DC converter 92 is used to transfer the energy from vehicle power supply system 66 into base vehicle electrical system 64. Optionally, the desired state of charge of the two energy stores may be set by appropriately switching switches 86, 88. To ensure the supply of the vehicle electrical system and to improve the efficiency, in certain operating cases or operating points it may be advantageous to feed energy of generator 80 directly into the 14 V level of base vehicle electrical system 64.

To increase the peak power consumption of vehicle electrical system 62 and to ensure supply to the consumers in the vehicle power supply system, the direction of energy flow of DC/DC converter 92 is reversed so that energy is transferred from base vehicle electrical system 64 into vehicle power supply system 66. This results in a reduction of the charging current of battery 82, in the present case a lead battery, which has a limited charge acceptance, in favor of an increase in the charging current provided for capacitor 84, since the charging current is better suited for accepting high power.

In recuperation mode, when second switch 88 is closed and first switch 86 is open, the maximum peak power may be limited if needed, in particular at low temperatures, by the maximum charge acceptance of battery 82 in base vehicle electrical system 64. By operating DC/DC converter 92, the recuperation power may be increased while providing the energy flow from base vehicle electrical system 64 toward vehicle power supply system 66.

The topology described with reference to FIG. 3 results in reduced costs for capacitor 84. The capacitor now needs fewer cells since it is placed directly at the 14 V level of base vehicle electrical system 64. In addition, at the same time, high-power consumers may be supplied directly from vehicle power supply system 66. The power of DC/DC converter 92 may be selected to be much lower in comparison to other topologies. If both energy stores are charged at the same time, DC/DC converter 92 is provided only for balancing. First switch 86 is used, among other things, for safeguarding circuit system 60, and may be closed in the event of a malfunction.

In contrast to conventional vehicle electrical system 2 (FIG. 1), in which the voltage in vehicle power supply system 6 must be set relatively low for normal operation due to the fact that sufficient leeway must be maintained to be able to accept the energy in ultracapacitor 20 in the case of recuperation, in the topology proposed in FIG. 3 a much higher and more uniform voltage level in generator 80 may be maintained during normal operation, thus increasing the efficiency.

Figure 4:
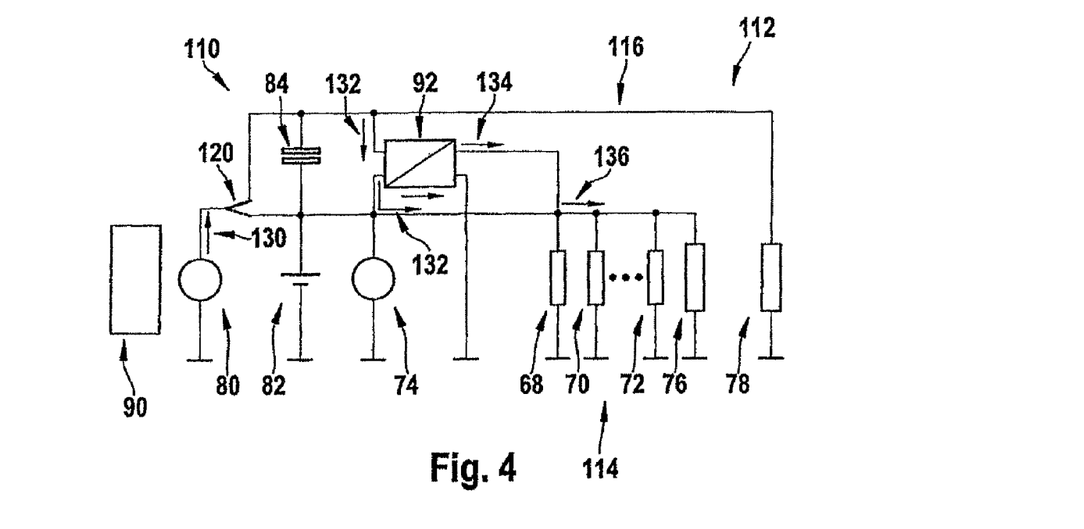
FIG. 4 shows a schematic illustration of a second specific example embodiment of a circuit system according to the present invention for a vehicle electrical system.

The second specific example embodiment of a circuit system 110 according to the present invention schematically illustrated in FIG. 4 likewise includes a generator 80, two energy stores, for example a battery 82 and a capacitor 84, connected in series, and a vehicle electrical system 112, which once again includes a base vehicle electrical system 114 and a vehicle power supply system 116. Besides battery 82, base vehicle electrical system 114 has a starter 74 and various consumers 68, 70, 72, 76. In the specific embodiment described here, vehicle power supply system 116 has capacitor 84 and one or multiple high-power consumers 78. An insulated DC/DC converter 92 is connected between base vehicle electrical system 114 and vehicle power supply system 116. For safety reasons and in special operating cases, the generator power may be fed directly into base vehicle electrical system 114 with the aid of an optional changeover switch 120.

Figure 5:
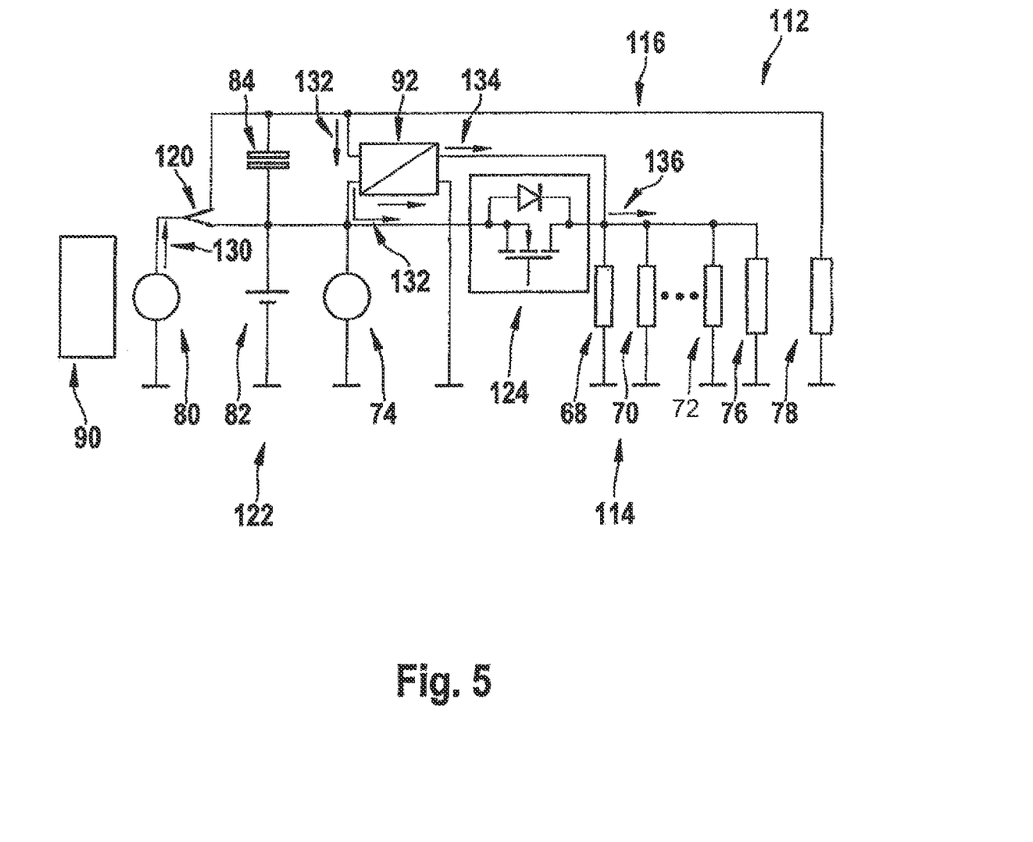
FIG. 5 shows a schematic illustration of a third specific embodiment of a circuit system according to the present invention for a vehicle electrical system.

The third specific embodiment of a circuit system 122 according to the present invention schematically illustrated in FIG. 5 differs from the second specific embodiment of circuit system 110 schematically illustrated in FIG. 4 by an additional component, which in the present case is designed as a switching element 124 having a diode characteristic, and is connected within base vehicle electrical system 114 between starter 74 and battery 82 and further consumers 68, 70, 74, 76.

In the vehicle electrical system topologies presented in FIGS. 4 and 5, DC/DC converter 92 is designed to compensate for the difference in potentials of the two energy stores, and thus, of battery 82, i.e., vehicle battery, and capacitor 84, which may be designed as an ultracapacitor or a double-layer capacitor.

The series connection composed of these two energy stores is supplied via generator 80. For the same vehicle electrical system power, lower generator currents are necessary compared to a conventional vehicle electrical system. For one thing, this increases the efficiency of generator 80 by approximately 10% as a function of the operating point, and optionally allows the use of a smaller generator model, for example having a load current of 120 A instead of 180 A. The same applies for circuit system 60 from FIG. 3.

As a result of the specialized circuitry of insulated DC/DC converter 92, among other things, the converter power necessary for supplying vehicle electrical system 114 is reduced. During steady-state operation, overall generator current 130 $I_G$ (minus the current required by high-power consumers 78) flows through the primary side of DC/DC converter 92 and subsequently supplies base vehicle electrical system 114. A primary current 132 $I_P$ of DC/DC converter 92 thus directly contributes to supplying base vehicle electrical system 114. Within DC/DC converter 92, the voltage present at the primary side (and the second energy store) and this primary current 132 $I_P$ are converted into a secondary current 134 $I_S$ and a voltage, respectively, and thus likewise supply base vehicle electrical system 114.

To supply, for example, the consumers of base vehicle electrical system 114 with 2500 W at 14 V, a load current of 180 A flows in base vehicle electrical system 114. If generator 80 is now operated at 22 V, approximately 120 A are sufficient for generator current 130 $I_G$. This generator current 130 $I_G$ flows as primary current 132 $I_P$ through the primary side of DC/DC converter 92 having an insulating design and subsequently supplies vehicle electrical system 114.

Secondary current 134 $I_S$ of DC/DC converter 92 is added to primary current 132 $I_P$, which together as load current 136 $I_L$ supplies vehicle electrical system 114. The required output power of DC/DC converter 92 is thus (180 A−120 A)*14 V=840 W in order to supply a 2500 W vehicle electrical system, for example.

In the recuperation case, DC/DC converter 92 is deactivated. Generator current 130 $I_G$ then flows through capacitor 84 above battery 82, and thus stores the recuperation energy. In this mode the generator setpoint voltage is successively increased until desired generator current 130 $I_G$ is reached. The recuperation power may be increased even further by installing bidirectional DC/DC converter 92. In this case, generator current 130 $I_G$ is then set higher than necessary for supplying vehicle electrical system 122 and for charging battery 82. This additional current is additionally stored in capacitor 84 by DC/DC converter 92, which is operated in reverse.

For assisting base vehicle electrical system 114, DC/DC converter 92 may additionally have a diode function, or alternatively, a switch 124 as shown in FIG. 5. When the voltage at battery 82 dips upon restarting, base vehicle electrical system 114 may be stably supplied by DC/DC converter 92. In contrast to present vehicle electrical system stabilization systems, battery 82 is not subjected in this case to load by base vehicle electrical system 114. At the same time, the diode function represents protection against polarity reversal for the components of base vehicle electrical system 114. Changeover switch 120 attached to generator 82 is optional, and functions as a backup in the event of failure of DC/DC converter 92 or in unfavorable operating cases.

The specific embodiments of a circuit system 60, 110 shown in FIGS. 3, 4, and 5 include a first energy store, which is designed as a battery 82 as an example, and a second, additional energy store, which in the present case is designed as a capacitor 84 (ultracapacitor) as an example. Other suitable energy stores may also usually be used in this type of circuit system 60, 110. Thus, it is possible for the first energy store to be designed as an accumulator or generator, for example a starter generator or a generator having an active boost function. Among other things, different types of capacitors 84, for example double-layer capacitors or also optionally accumulators, may be used for the second energy store.

What is claimed is:
1. A circuit system for an electrical system of a vehicle, comprising:
    a first vehicle electrical subsystem that supplies a base vehicle power, the first vehicle electrical subsystem having:
        a starter,
        a first set of loads, and a first energy store;
a second vehicle electrical subsystem that supplies power to a second set of loads, the second vehicle electrical subsystem having:
the second set of loads, and
a second energy store;
a DC/DC converter that has an insulating design, and the DC/DC converter being connected: (i) between the first base vehicle electrical subsystem and the second vehicle electrical subsystem and (ii) in parallel to at least one of the first energy store and the second energy store; and
a generator that supplies a generator current to at least one of the first electrical subsystem and the second electrical subsystem via at least one switching device;
wherein the first energy store is connected in series to the second energy store, and
wherein a current supplied to one of the first energy store and the second energy store is varied according to an operating case that depends on: (a) the at least one switching device supplying the generator current to one of the first electrical subsystem or the second electrical subsystem; and (b) a state of the DC/DC converter;
wherein the at least one switching device is a changeover switch connecting both the first energy store and the second energy store to the generator, and
the DC/DC converter has a primary side and a secondary side, and during:
a forward transmission, the primary side of the DC/DC converter transfers energy in a direction from the second set of loads to the first set of loads, the secondary side of the DC/DC converter receives the transferred energy from the primary side,
a reverse transmission, the secondary side of the DC/DC converter transfers energy in a direction from the first set of loads to the second set of loads, the primary side of the DC/DC converter receives the transferred energy from the secondary side.

2. The circuit system as recited in claim 1, wherein the generator is connected in parallel to the first energy store and the second energy store.

3. The circuit system as recited in claim 2, wherein the first energy store and the second energy store are connected to the generator via at least one circuit.

4. The circuit system as recited in claim 1, wherein the second energy store is one of a double-layer capacitor, an accumulator, and an ultracapacitor.

5. The circuit system as recited in claim 1, further comprising:
a module for influencing a direction and a magnitude of a current flowing through the DC/DC converter.

6. The circuit system as recited in claim 1, wherein when the DC/DC converter performs the forward transmission, a charging current of the second energy store is decreased by:
converting the generator current from an input at the primary side of the DC/DC converter into a secondary current at the secondary side of the DC/DC converter, and
adding the secondary current to the generator current thereby producing a load current that supplies the first set of loads of the first vehicle electrical subsystem.

7. The circuit system as recited in claim 1, wherein when the DC/DC converter performs the reverse transmission, a charging current of the second energy store is increased by:
converting a secondary current at the secondary side of the DC/DC converter into a primary current at the primary side of the DC/DC converter,
adding the primary current to the generator current thereby producing a sum current, and supplying the second energy store with the sum current.

8. A method for operating an electrical system of a vehicle that includes: (i) a first vehicle electrical subsystem that supplies a base vehicle power, the first electrical subsystem having a starter, a first set of loads, and a first energy store, (ii) a second vehicle electrical subsystem that supplies power to a second set of loads, the second vehicle electrical subsystem having the second set of loads, a second energy store, (iii) a DC/DC converter that has an insulating design, the first energy store and the second energy store being connected in series, the DC/DC converter being connected between the first vehicle electrical subsystem and the second vehicle electrical subsystem and also in parallel to at least one of the first energy store and the second energy store, and (iv) a generator that supplies a generator current to at least one of the first electrical subsystem and the second electrical subsystem via at least one switching device, the method comprising:
supplying a current to at least one of the first energy store and the second energy store;
varying the supplied current according to an operating case that changes at least one of:
(a) the at least one switching device so that the generator current is supplied to the first electrical subsystem or the second electrical subsystem, and
(b) a state of the DC/DC converter;
wherein the at least one switching device is a changeover switch connecting both the first energy store and the second energy store to the generator, and
the DC/DC converter has a primary side and a secondary side, and during:
a forward transmission, the primary side of the DC/DC converter transfers energy in a direction from the second set of loads to the first set of loads, the secondary side of the DC/DC converter receives the transferred energy from the primary side,
a reverse transmission, the secondary side of the DC/DC converter transfers energy in a direction from the first set of loads to the second set of loads, the primary side of the DC/DC converter receives the transferred energy from the secondary side.

9. The method as recited in claim 8, wherein the operating case is a fifth operating case in which the forward transmission is performed to decrease a charging current of the second energy store, the fifth operating case comprising when the DC/DC converter:
converts the generator current from an input at the primary side of the DC/DC converter into a secondary current at the secondary side of the DC/DC converter, and
adds the secondary current to the generator current thereby producing a load current that supplies the first set of loads of the first vehicle electrical subsystem.

10. The method as recited in claim 8, wherein the operating case is a sixth operating case in which the reverse transmission is performed to increase a charging current of the second energy store, the sixth operating case comprising when the DC/DC converter:
converts a secondary current at the secondary side of the DC/DC converter into a primary current at the primary side of the DC/DC converter,
adds the primary current to the generator current thereby producing a sum current, and
supplies the second energy store with the sum current.

11. The method as recited in claim 8, wherein the operating case is a sixth operating case in which the reverse transmission is performed to increase a charging current of the second energy store, the sixth operating case comprising when the DC/DC converter:
increase a generator setpoint voltage of the generator until the generator current is a predetermined value, and
deactivate the DC/DC converter.

12. A method for operating an electrical system of a vehicle that includes: (i) a first vehicle electrical subsystem that supplies a base vehicle power, the first electrical subsystem having a starter, a first set of loads, and a first energy store, (ii) a second vehicle electrical subsystem that supplies power to a second set of loads, the second vehicle electrical subsystem having the second set of loads, a second energy store, (iii) a DC/DC converter that has an insulating design, the first energy store and the second energy store being connected in series, the DC/DC converter being connected between the first vehicle electrical subsystem and the second vehicle electrical subsystem and also in parallel to at least one of the first energy store and the second energy store, and (iv) a generator that supplies a generator current to at least one of the first electrical subsystem and the second electrical subsystem via at least one switching device, the method comprising:
supplying a current to at least one of the first energy store and the second energy store;
varying the supplied current according to an operating case that changes at least one of:
(a) the at least one switching device so that the generator current is supplied to the first electrical subsystem or the second electrical subsystem, and
(b) a state of the DC/DC converter;
the at least one switching device includes a first switch and a second switch, each of the first and second switches having an open state and a closed state, wherein the first energy store is connected to the generator via the closed state of the first switch, and the second energy store is connected to the generator via the closed state of the second switch, and
the DC/DC converter one of: transfers energy in a first direction from the first vehicle electrical subsystem to the second vehicle electrical subsystem, transfers energy in a second direction from the second vehicle electrical subsystem to the first vehicle electrical subsystem, and is OFF;
wherein during a peak power operation, a first portion of the current flows to the first energy store after passing through the second energy store and a second portion of the current flows back to the second energy store after having passed through the second energy store via the DC/DC converter when the operating case is a third operating case in which the DC/DC converter transfers energy in the first direction.

13. The method as recited in claim 12, wherein the electrical system is in a steady-state when the operating case is a first operating case in which the second switch is in the closed state, the first switch is in the open state, and the DC/DC converter transfers energy in the second direction.

14. The method as recited in claim 12, wherein the second energy store is charged when the operating case is a second operating case in which the second switch is in the closed state, the first switch is in the open state, and the DC/DC converter is OFF.

15. The method as recited in claim 12, wherein the second energy store is discharged to supply energy to the first vehicle electrical subsystem when the operating case is a fourth operating case in which the DC/DC converter relieves the first energy store.

16. The method as recited in claim 12, wherein the third operating case includes one of:
the second switch is in the closed state and the first switch is in the open state, and
the second switch and the first switch are alternatingly switched to provide a predetermined level for each of the first portion of the current and the second portion of the current.

17. A circuit system for an electrical system of a vehicle, comprising:
a first vehicle electrical subsystem that supplies a base vehicle power, the first vehicle electrical subsystem having:
a starter,
a first set of loads, and
a first energy store;
a second vehicle electrical subsystem that supplies power to a second set of loads, the second vehicle electrical subsystem having:
the second set of loads, and
a second energy store;
a DC/DC converter that has an insulating design, and the DC/DC converter being connected: (i) between the first base vehicle electrical subsystem and the second vehicle electrical subsystem and (ii) in parallel to at least one of the first energy store and the second energy store; and
a generator that supplies a generator current to at least one of the first electrical subsystem and the second electrical subsystem via at least one switching device;
wherein the first energy store is connected in series to the second energy store, and wherein a current supplied to one of the first energy store and the second energy store is varied according to an operating case that depends on: (a) the at least one switching device supplying the generator current to one of the first electrical subsystem or the second electrical subsystem; and (b) a state of the DC/DC converter;
wherein the at least one switching device includes a first switch and a second switch, each of the first and second switches having an open state and a closed state, wherein the first energy store is connected to the generator via the closed state of the first switch, and the second energy store is connected to the generator via the closed state of the second switch, and
the DC/DC converter one of: transfers energy in a first direction from the first vehicle electrical subsystem to the second vehicle electrical subsystem, transfers energy in a second direction from the second vehicle electrical subsystem to the first vehicle electrical subsystem, and is OFF;
wherein during a peak power operation, a first portion of the current flows to the first energy store after passing through the second energy store and a second portion of the current flows back to the second energy store after having passed through the second energy store via the DC/DC converter when the operating case is a third operating case in which the DC/DC converter transfers energy in the first direction.

18. The circuit system as recited in claim 17, wherein the electrical system is in a steady-state when the operating case is a first operating case in which the second switch is in the closed state, the first switch is in the open state, and the DC/DC converter transfers energy in the second direction.

* * * * *